A. PETIO.
WEATHER SIGNAL.
APPLICATION FILED JULY 5, 1911.

1,100,775.

Patented June 23, 1914.

2 SHEETS—SHEET 1.

WITNESSES:
John C. Sanders
Leon Spring

INVENTOR:
Adolf Petio,
BY Wm Wallace White
ATTY

A. PETIO.
WEATHER SIGNAL.
APPLICATION FILED JULY 5, 1911.

1,100,775.

Patented June 23, 1914.
2 SHEETS—SHEET 2.

WITNESSES:
John C. Sanders
Albert F. Heuman

INVENTOR:
Adolf Petio
BY
ATTY.

UNITED STATES PATENT OFFICE.

ADOLF PETIO, OF MAFFERSDORF, NEAR REICHENBERG, AUSTRIA-HUNGARY.

WEATHER-SIGNAL.

1,100,775.  Specification of Letters Patent.  Patented June 23, 1914.

Application filed July 5, 1911. Serial No. 636,815.

*To all whom it may concern:*

Be it known that I, ADOLF PETIO, employee, a subject of the Emperor of Austria-Hungary, residing at Maffersdorf, near Reichenberg, Bohemia, in the Empire of Austria-Hungary, have invented certain new and useful Improvements in Weather-Signals, of which the following is a specification.

My invention consists of a weather-signal, which is particularly suitable for barometers, but may also be employed with hygrometers or other instruments.

As is well known, the weather depends upon the atmospheric pressure. When the pressure of the air rises or sinks, the weather promises to be fair or is setting in for rain. The normal atmospheric pressure depends upon the height of the respective place, but with the aid of my weather-signal it is possible to at once read off without any correction the weather that may be expected.

The new weather-signal essentially consists of a movable index, which is so connected with the shaft of the pointer or indicator of an instrument by means of a gearing and pawls as to be always turned through an angle to either side if the pointer or indicator changes its position.

I will now proceed to describe my invention with reference to the accompanying drawing, in which—

Figure 1:
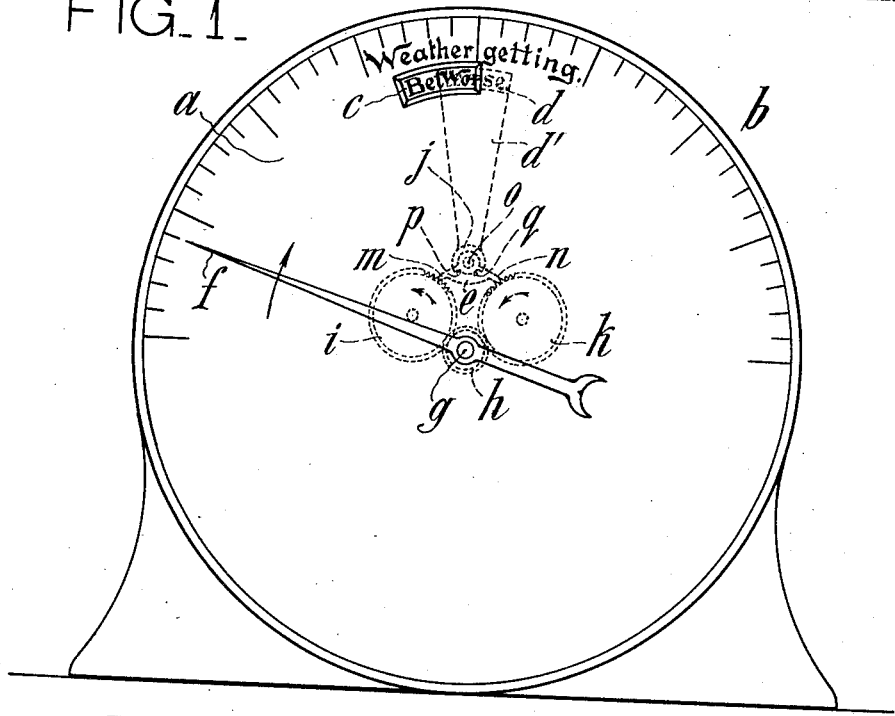
Figure 2:
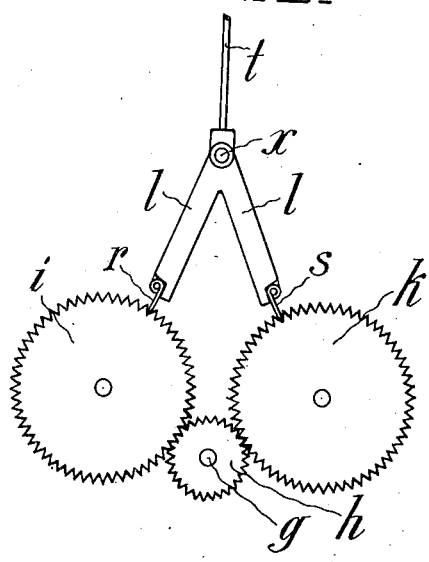
Figure 3:
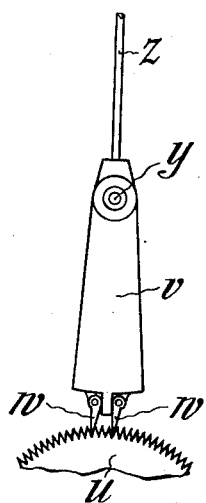
Figures 4, 5, 6:
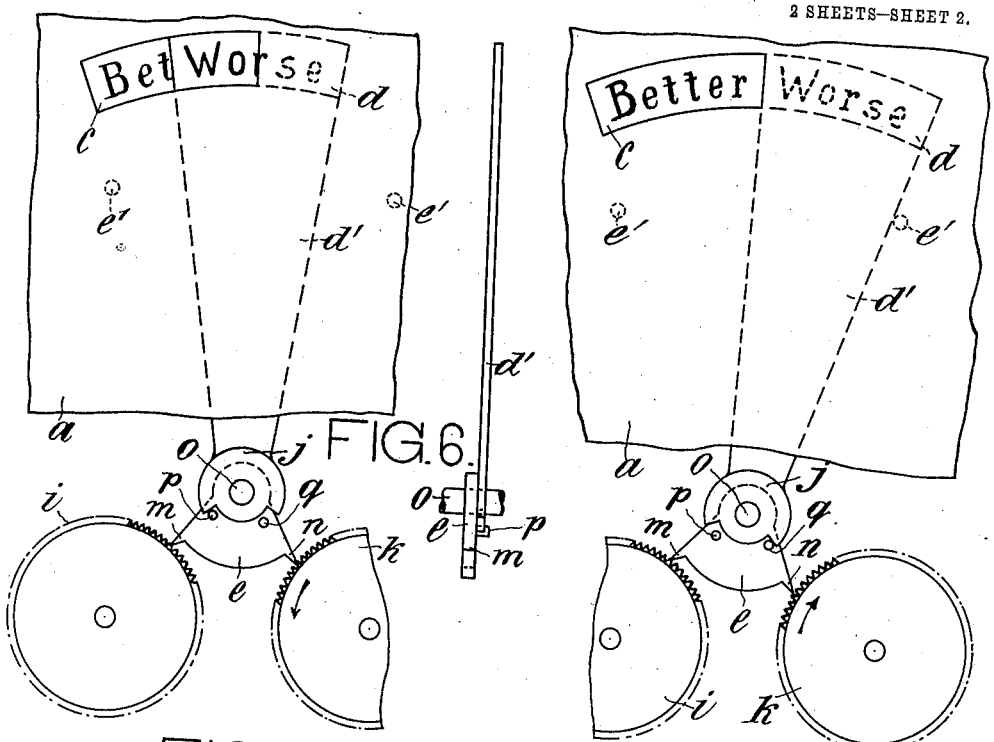
Figure 7:
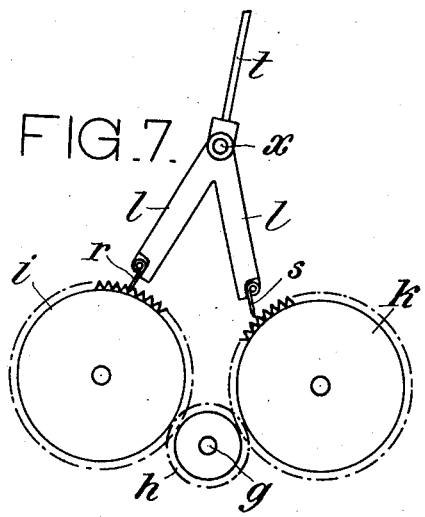

Figure 1 is an elevation of a barometer provided with the new weather-signal, Fig. 2 shows on a larger scale a modification of the gearing and pawls, the movable index being broken away, and Fig. 3 shows a further modification of the gearing and pawls. Fig. 4 shows the mechanism in the form of construction of Fig. 1 with a part of the cover plate in the central position on an enlarged scale. Fig. 5 shows the same mechanism in the right end position. Fig. 6 is a side view of the indicating dial and its directly co-acting parts. Fig. 7 shows the mechanism of Fig. 2 in the right end position.

Fig. 1 illustrates for example a barometer $b$ of any known construction, which I do not further describe, as it is immaterial to my invention. The dial $a$ carries for example a stationary inscription "Weather getting" and a stationary index $c$ with an inscription "Better" as shown. The stationary index $c$ may be attached to the dial $a$ in any known manner, for example it may be a plate within the casing behind the dial $a$ at a small distance therefrom and connected therewith by means of studs or the like, in which case the dial is provided with a window or aperture, through which the inscription is visible. The shaft $g$ of the pointer $f$ has fastened on it a pinion $h$, which meshes with two like gear wheels $i$ $k$, so that the latter are always both turned in the same direction opposite to that of the pointer $f$. A shaft $o$ parallel to $g$ is mounted to turn in the casing. Fastened on said shaft is a segment $e$ provided with the two pawls $m$ $n$ and with two pins $p$ $q$. Loose on the shaft $o$ is a disk or nave $j$ of an arm $d^1$ moving between the dial $a$ and the stationary index $c$. The free end $d$ of the arm $d^1$ serves as a movable index and carries for example the inscription "Worse." Suitable stops $e^1$ are disposed on the inner side of the dial $a$ for limiting the turn of the arm $d^1$ in such a manner, that the movable index $d$ can either completely cover the stationary index $c$ or completely disclose the same. When the movable index $d$ discloses the stationary index $c$, it is to be hidden by the dial $a$, as shown in Fig. 5. When the arm $d^1$ occupies its middle position, as shown in Figs. 1 and 2, it only partly covers the stationary index and is itself partly hidden. The disk or nave $j$ has in its periphery a recess, in which the two pins $p$ and $q$ engage in such a manner, that when the arm $d^1$ is slightly turned from its middle position to either side, it is to further turn under the action of its own weight, until it strikes the respective stop. In Figs. 1 and 4 the arm $d^1$ is shown in the exact center position. If the wheels $i$, $k$ further rotate in the direction indicated by the arrows, the arm $d^1$ falls by gravity toward the right until it meets right stop $e^1$, as shown in Fig. 5. Segment $e$ and pawls $m$, $n$ are carried along by wheel $k$ only until both pawls ride on the teeth of wheels $k$, $i$. At the further rotation of the wheels in the same direction, the segment will therefore remain stationary and is only slightly lifted by each tooth passing the pawls, to immediately fall back into its position. Since segment *e* has the tendency to always fall by its own weight in the middle position, pawl *m* engages immediately wheel *i*, as soon as the rotation of the pinions is reversed. In consequence segment *e* is now turned back to the left, because pin *q* is now in engagement with the notch of nave *j*. When assuming the pressure of the air to rise, then the pointer *f*, which may occupy any position, for example as shown, will turn in the direction of the arrow, so that the gear wheel *i* turning in the direction of the arrow will move by means of the pawl *m* the segment *e* and by means of the pin *p* the arm $d^1$ in the direction of the hands of a watch. When the pointer *f* has turned through a sufficient angle, the arm $d^1$ will be turned beyond the middle position shown in Figs. 1 and 4, so that it will be further turned by its weight and will fully disclose the stationary index *c* with the inscription "Better," as shown in Fig. 5. When the atmospheric pressure commences to sink, the other gear wheel *k* will turn the arm $d^1$ in the opposite direction, so that the inscription "Better" is partly covered, and when the pressure has sufficiently sunk, this inscription will be entirely covered.

From the above explanations it will be evident, that the weather-signal will operate in the same manner for any height of the respective place. If the atmospheric pressure sinks, the movable index *d* will be turned in one direction, and if the pressure rises, the index will be turned in the opposite direction, no matter, whether the barometer be at a height of 100 meters or at a height of 1000 meters above the level of the sea.

Fig. 2 shows a modification of the gearing and pawls which differs from Fig. 1 chiefly in that the arm *t* carrying the movable index (similar to *d*) is constantly pressed into the middle position by the own weight of the two arms *l l* carrying the two pawls *r* and *s*. The three arms *l l t* are all fastened on the shaft *x* and there are no stops on the inside of the dial *a* for limiting the turn of the arm *t*. The two pawls *r s* are shown to bear under the action of their own weight on radial surfaces of the arms *l l* in such a manner, that they are permitted to turn outward but not inward beyond the radial center lines. If, for instance, the wheels *i, k* turned in the direction opposite to that of the dial indicator, the pawl *s*, in engagement with wheel *k*, carries the arms *l, l* along, until it is out of engagement with wheel *k*; i. e., until the pawl rides on the teeth of this wheel, and the arms then take the position shown in Fig. 7. When in this position, both pawls *r* and *s* will ride, at a further rotation of the wheels *i, k* in the same direction, on the teeth of their respective wheels. Since, however, the arms *l, l*, the weight of which exceeds the weight of arm *t* with the indicator attached thereto, have the tendency to return by their own weight to the middle position, shown in Fig. 2, the pawl *r* is, at a rotation of wheels *i, k* in the opposite direction, immediately carried along by wheel *i*, and arms *l, l* are turned in a direction opposite to their former rotation.

Fig. 3 shows a further modification of the gearing and pawls, which differs from Fig. 2 in that the two arms *l l* are replaced by a single arm *v* and that the two gear wheels *i k* are omitted, while the pinion *h* is replaced by a gear wheel *u*, in which two pawls *w w* at the arm *v* engage. The two arms *v* and *z* are fastened on the shaft *y* and the effect of this gearing will be the same as before, only that the arm *z* will turn in a direction opposite to that of $d^1$ or *t*, so that the two inscriptions "Better" and "Worse" will require to be exchanged.

The weather-signal can be modified in many respects without departing from the spirit of my invention. The pawl-carrier may be pressed into the middle position by springs instead of by their own weight, or the pawls may be spring-pressed or elastic.

The weather-signal may be connected with a hygrometer of any known construction or with any other known meteorologic or meteorographic instrument instead of the barometer.

I claim:

1. In a pressure indicating device, the combination with a pointer traveling over a dial and operating means therefor, of a pivoted indicator, normally inoperative oscillating means for said indicator and means interposed between the pointer operating means and the pivoted indicator whereby said oscillating means are rendered operative only at the instant of reversal of direction of said operative means.

2. In a pressure indicating device, the combination with a pointer traveling over a dial and operating means therefor, of an oscillating indicator pivoted on a stationary axis, a pivoted pawl member, means whereby movement of the pawl member in either direction imparts corresponding movement to the indicator and means for rocking the pawl on reversal of the direction of the pointer operating means.

3. In a pressure indicating device, the combination with a pointer traveling over a dial and operating means therefor, of a pivoted indicator, an oscillating pawl member, projections on said pawl member whereby movement of the pawl member in either direction imparts corresponding movement to the indicator, and gearing whereby said pawl member is oscillated by said operating means only upon change of direction thereof.

4. In a pressure indicating device, the combination with a pointer traveling over a dial and operating means therefor, of an oscillatory indicator and an automatic disengageable connection between the pointer operating means and the indicator normally disengaged, and rendered effective momentarily by the reversal of said operating means, said automatically disengaging connection throwing itself out on the continued movement of the operating means in the said reversed direction.

In testimony whereof I affix my signature in presence of two witnesses.

ADOLF PETIO.

Witnesses:
 FRANZ SIMON,
 ADOLF JÄKEL.

Copies of this patent may be obtained for five cents each, by addressing the "Commissioner of Patents, Washington, D. C."